US012300255B2

(12) United States Patent
Nandwana et al.

(10) Patent No.: US 12,300,255 B2
(45) Date of Patent: *May 13, 2025

(54) SYNTHESIZING AUDIO FOR SYNCHRONOUS COMMUNICATION

(71) Applicant: Roblox Corporation, San Mateo, CA (US)

(72) Inventors: Mahesh Kumar Nandwana, Sunnyvale, CA (US); Kiran Bhat, San Francisco, CA (US); Morgan McGuire, Waterloo (CA)

(73) Assignee: Roblox Corporation, San Mateo, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 17/959,736

(22) Filed: Oct. 4, 2022

(65) Prior Publication Data

US 2024/0112691 A1 Apr. 4, 2024

(51) Int. Cl.
*G10L 19/16* (2013.01)
*G10H 1/00* (2006.01)
(Continued)

(52) U.S. Cl.
CPC ......... *G10L 19/167* (2013.01); *G10H 1/0008* (2013.01); *G10H 1/368* (2013.01);
(Continued)

(58) Field of Classification Search
CPC ... G10L 19/167; G10L 13/047; G10L 21/003; G10L 21/055; G10H 1/0008; G10H 1/368
(Continued)

(56) References Cited

U.S. PATENT DOCUMENTS

2002/0134222 A1* 9/2002 Tamura .................... G10H 7/02 84/622
2011/0276334 A1* 11/2011 Wang ..................... G10H 1/361 704/E21.001

(Continued)

FOREIGN PATENT DOCUMENTS

CN 1345492 A * 4/2002 ............ H04H 20/30
CN 206339587 U * 7/2017

(Continued)

OTHER PUBLICATIONS

"Shazam app", Retrieved from Internet: https://www.shazam.com/, 2022, 7 pages.

(Continued)

*Primary Examiner* — Edwin S Leland, III
(74) *Attorney, Agent, or Firm* — IP Spring

(57) ABSTRACT

A computer-implemented method includes receiving a first audio stream of a performance associated with a first client device. The method further includes during a time window of the performance, wherein the time window is less than a total time of the performance: generating a synthesized first audio stream that predicts a future of the performance based on audio features of the first audio stream and mixing the synthesized first audio stream and a second audio stream associated with a second client device to form a combined audio stream that synchronizes the synthesized first audio stream and the second audio stream, where the time window is advanced and the generating and the mixing are repeated until the performance is complete.

20 Claims, 9 Drawing Sheets

(51) Int. Cl.

| | |
|---|---|
| ***G10H 1/36*** | (2006.01) |
| ***G10L 13/047*** | (2013.01) |
| ***G10L 21/003*** | (2013.01) |
| ***G10L 21/055*** | (2013.01) |

(52) U.S. Cl.
CPC .......... *G10L 13/047* (2013.01); *G10L 21/003* (2013.01); *G10L 21/055* (2013.01)

(58) Field of Classification Search
USPC .......................................................... 704/267
See application file for complete search history.

(56) References Cited

U.S. PATENT DOCUMENTS

| | | | | |
|---|---|---|---|---|
| 2019/0341068 | A1* | 11/2019 | Shen | G10L 25/60 |
| 2020/0225844 | A1* | 7/2020 | Lerner | G06F 3/0482 |
| 2021/0337248 | A1* | 10/2021 | Huang | H04N 5/265 |
| 2022/0270314 | A1* | 8/2022 | Navarro | G06T 7/73 |
| 2023/0394764 | A1* | 12/2023 | Ladavac | G06T 7/13 |
| 2023/0394767 | A1* | 12/2023 | Ladavac | G06T 17/205 |
| 2024/0087596 | A1* | 3/2024 | Nandwana | G10L 25/57 |
| 2024/0112689 | A1* | 4/2024 | Nandwana | G10H 1/368 |
| 2024/0112691 | A1* | 4/2024 | Nandwana | G10L 13/047 |

FOREIGN PATENT DOCUMENTS

| | | | | |
|---|---|---|---|---|
| CN | 107221337 A | * | 9/2017 | G10L 21/02 |
| WO | WO-2024076532 A1 | * | 4/2024 | G10L 13/047 |

OTHER PUBLICATIONS

Arik, et al., "Neural Voice Cloning with a Few Samples", Advances in neural information processing systems 31, 2018, 11 pages.

Barrera, et al., "Improving Audio Quality in Duo with WaveNetEQ", Retrieved from Internet: https://ai.googleblog.com/2020/04/improving-audio-quality-in-duo-with.html, Apr. 1, 2020, 5 pages.

Böck, et al., "Enhanced beat tracking with context-aware neural networks", Proc. Int. Conf. Digital Audio Effects, 2011, 5 pages.

Chen, et al., "TVQVC: Transformer based Vector Quantized Variational Autoencoder with CTC loss for Voice Conversion", Interspeech 2021, 2021, 5 pages.

Dhariwal, et al., "Jukebox", Retrieved from Internet: https://openai.com/blog/jukebox/, Apr. 30, 2020, 14 pages.

Dhariwal, et al., "Jukebox: a Generative Model for Music", arXiv preprint arXiv:2005.00341, 2020, 20 pages.

Van Den Oord, et al., "Representation Learning with Contrastive Predictive Coding", arXiv preprint arXiv:1807.03748, 2018, 13 pages.

Vesely, "The language-independent bottleneck features", In 2012 IEEE Spoken Language Technology Workshop (SLT), 2012, pp. 336-341.

Zen, et al., "Statistical parametric speech synthesis", Speech Communication 51, No. 11, 2009, pp. 1039-1064.

Zen, et al., "Statistical parametric speech synthesis using deep neural networks", In 2013 IEEE International Conference on Acoustics, Speech and Signal Processing, 2013, pp. 7962-7966.

Zhou, et al., "Limited Data Emotional Voice Conversion Leveraging Text-to-Speech: Two-stage Sequence-to-Sequence Training", arXiv preprint arXiv:2103.16809, 2021, 5 pages.

USPTO, , International Search Report for International Patent Application No. PCT/US2023/034284, Jan. 31, 2024, 2 pages.

USPTO, , Written Opinion for International Patent Application No. PCT/US2023/034284, Jan. 31, 2024, 6 pages.

USPTO, Non-final Office Action for U.S. Appl. No. 17/959,937, Sep. 20, 2024, 11 pages.

USPTO, Notice of Allowance for U.S. Appl. No. 17/959,937, Jan. 24, 2025, 9 pages.

* cited by examiner

SYNTHESIZING AUDIO FOR SYNCHRONOUS COMMUNICATION

BACKGROUND

It is impossible for multiple people that are physically in different locations but connected by a computer network to perform music, chant, or talk in synchrony. That is because person P0's performance as observed by person P1 is always in the past due to the transmission delay of the computer network. If each of n−1 performers P1, P2, P3, . . . P(n−1) delayed themselves by exactly the right amount of time relative to performer P0, then P0 would observe everyone else in sync with each other, but cannot themselves synchronize with the others.

The delay may be due to one or more of at least three types of latency: network latency, input latency, and processing latency. Network latency occurs when there are deficiencies in the network transmission time that are due to the physical equipment used in the network or a delay in the processing time at the nodes. Input latency occurs when the user has a delayed response, is using a client device with limited capabilities, etc. Processing latency may occur when a delay is intentionally introduced in order to perform moderation analysis.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments relate generally to a system and method to synthesize audio for synchronous communication. According to one aspect, a computer-implemented method includes receiving a first audio stream of a performance associated with a first client device. The method further includes during a time window of the performance, wherein the time window is less than a total time of the performance: generating a synthesized first audio stream that predicts a future of the performance based on audio features of the first audio stream; and mixing the synthesized first audio stream and a second audio stream associated with a second client device to form a combined audio stream that synchronizes the synthesized first audio stream and the second audio stream, where the time window is advanced and the generating and the mixing are repeated until the performance is complete.

In some embodiments, the method further includes responsive to receiving the first audio stream, determining a performance identifier for the performance associated with the first audio stream and receiving a reference audio based on the performance identifier. In some embodiments, generating the synthesized first audio stream includes determining a time offset between the first audio stream and the reference audio and the time offset occurs when the first audio stream has a different starting point from the reference audio and generating the synthesized first audio stream is further based on the time offset. In some embodiments, generating the synthesized first audio stream includes determining a rate of the first audio stream as compared to a rate of the reference audio and generating the synthesized first audio stream is further based on the rate of the first audio stream as compared to the rate of the reference audio. In some embodiments, the audio features of the first audio stream are selected from the group of pitch, rate, phase, or combinations thereof. In some embodiments, the audio features of the first audio stream include one or more speaker identifiers detected in the first audio stream. In some embodiments, the method further includes determining that a time difference between the first audio stream and the second audio stream exceeds a threshold time difference and generating graphical data for displaying a user interface that includes user guidance for the performance and a moving indicator that prompts a performer associated with the second client device to perform in a way that reduces the time difference between the first audio stream and the second audio stream. In some embodiments, the method further includes modifying the combined audio stream to be consistent with acoustics of an environment where the second client device is located. In some embodiments, generating the synthesized first audio stream includes identifying that a portion of the performance was skipped in the first audio stream and synthesizing the first audio stream to correct for the portion of the performance that was skipped. In some embodiments, the method further includes synchronizing the combined audio stream to match actions of performers that are displayed graphically.

In some embodiments, a device includes a processor and a memory coupled to the processor, with instructions stored thereon that, when executed by the processor, cause the processor to perform operations comprising: receiving a first audio stream of a performance associated with a first client device and during a time window of the performance, wherein the time window is less than a total time of the performance: generating a synthesized first audio stream that predicts a future of the performance based on audio features of the first audio stream and mixing the synthesized first audio stream and a second audio stream associated with a second client device to form a combined audio stream that synchronizes the synthesized first audio stream and the second audio stream, where the time window is advanced and the generating and the mixing are repeated until the performance is complete.

In some embodiments, responsive to receiving the first audio stream, determining a performance identifier for the performance associated with the first audio stream and receiving a reference audio based on the performance identifier. In some embodiments, generating the synthesized first audio stream includes generating the synthesized first audio stream includes determining a time offset between the first audio stream and the reference audio and the time offset occurs when the first audio stream has a different starting point from the reference audio and generating the synthesized first audio stream is further based on the time offset. In some embodiments, generating the synthesized first audio stream includes determining a rate of the first audio stream as compared to a rate of the reference audio and generating the synthesized first audio stream is further based on the rate of the first audio stream as compared to the rate of the reference audio. In some embodiments, the audio features of the first audio stream are selected from the group of pitch, rate, phase, or combinations thereof.

In some embodiments, a non-transitory computer-readable medium with instructions stored thereon that, when executed by one or more computers, causes the one or more computers to perform operations, the operations comprising: receiving a first audio stream of a performance associated with a first client device and during a time window of the performance, wherein the time window is less than a total time of the performance: generating a synthesized first audio stream that predicts a future of the performance based on audio features of the first audio stream and mixing the synthesized first audio stream and a second audio stream associated with a second client device to form a combined audio stream that synchronizes the synthesized first audio stream and the second audio stream, where the time window is advanced and the generating and the mixing are repeated until the performance is complete.

In some embodiments, responsive to receiving the first audio stream, determining a performance identifier for the performance associated with the first audio stream and receiving a reference audio based on the performance identifier. In some embodiments, generating the synthesized first audio stream includes generating the synthesized first audio stream includes determining a time offset between the first audio stream and the reference audio and the time offset occurs when the first audio stream has a different starting point from the reference audio and generating the synthesized first audio stream is further based on the time offset. In some embodiments, generating the synthesized first audio stream includes determining a rate of the first audio stream as compared to a rate of the reference audio and generating the synthesized first audio stream is further based on the rate of the first audio stream as compared to the rate of the reference audio. In some embodiments, the audio features of the first audio stream are selected from the group of pitch, rate, phase, or combinations thereof.

The application advantageously describes a metaverse engine and/or a metaverse application that generates a synthesized first audio stream that predicts a future of the performance based on audio features of the first audio stream and mixes the synthesized first audio stream and a second audio stream associated with a second client device to form a combined audio stream that synchronizes the synthesized first audio stream and the second audio stream so that the users that created the audio streams are perceived as singing or speaking in synchronicity. The generating of a synthesized first audio stream and mixing the synthesized first audio stream with a second audio stream may be performed on different devices, including combinations of a first audio device, a second audio device, and a server. As a result, the method is distributed across multiple devices and any delay in the streaming, synthesizing, or mixing process is hidden by the mixing step so that the users listening to the performance do not perceive any latency.

DETAILED DESCRIPTION

Network Environment 100

Figure 1:
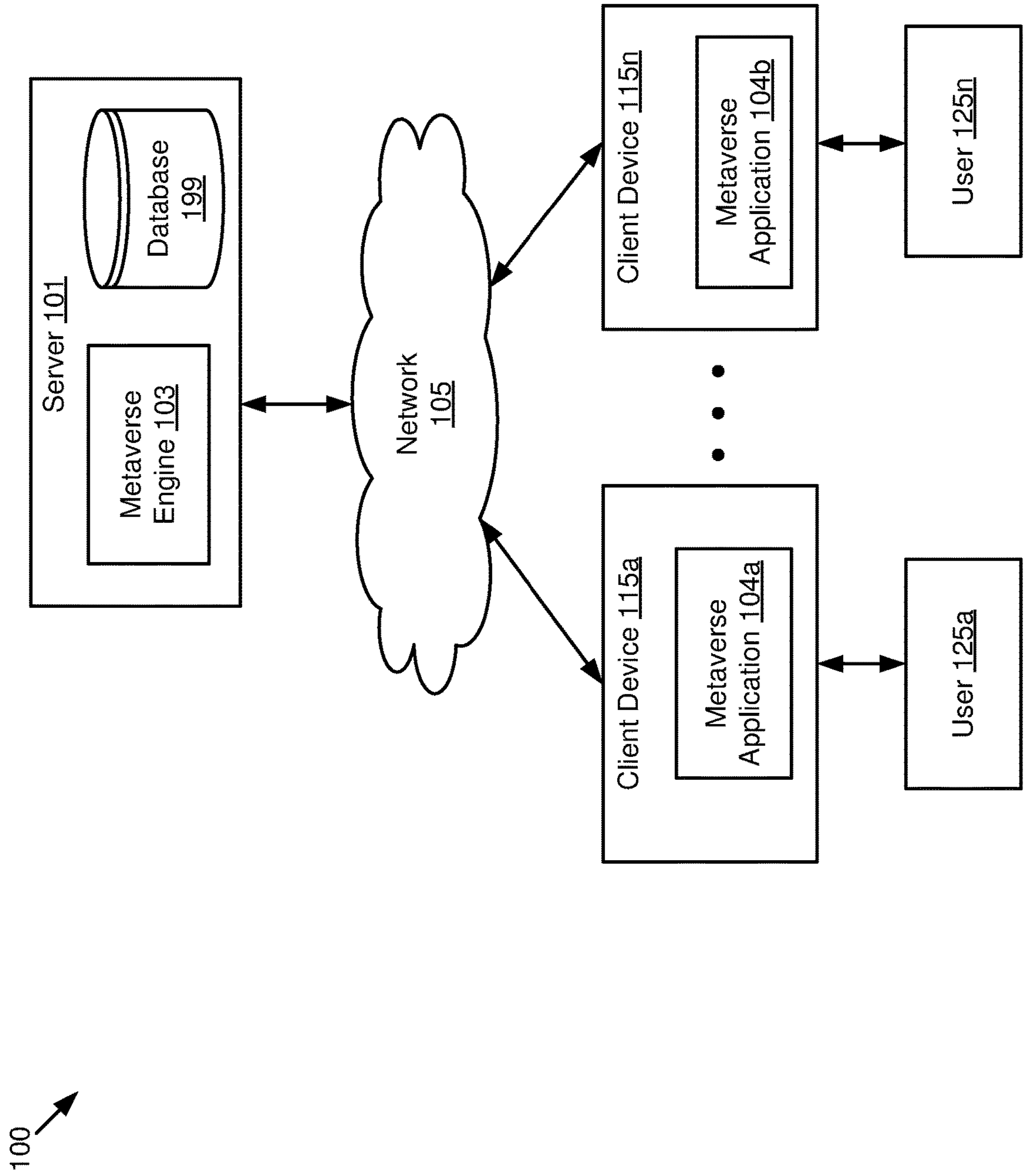
FIG. 1 is a block diagram of an example network environment to synthesize audio for synchronous communication, according to some embodiments described herein.

FIG. 1 illustrates a block diagram of an example environment 100 to synthesize audio for synchronous communication. In some embodiments, the environment 100 includes a server 101, and client devices 115_a_ . . . _n_, coupled via a network 105. Users 125_a_ . . . _n_ may be associated with the respective client devices 115_a_ . . . _n_. In FIG. 1 and the remaining figures, a letter after a reference number, e.g., "115_a_," represents a reference to the element having that particular reference number. A reference number in the text without a following letter, e.g., "115," represents a general reference to embodiments of the element bearing that reference number. In some embodiments, the environment 100 may include other servers or devices not shown in FIG. 1. For example, the server 101 may be multiple servers 101.

The server 101 includes one or more servers that each include a processor, a memory, and network communication hardware. In some embodiments, the server 101 is a hardware server. The server 101 is communicatively coupled to the network 105. In some embodiments, the server 101 sends and receives data to and from the client devices 115. The server 101 may include a metaverse engine 103 and a database 199.

In some embodiments, the metaverse engine 103 includes code and routines operable to facilitate communication between client devices 115 associated with two or more users in a virtual metaverse, for example, at a same location in the metaverse, within a same metaverse experience, or between friends within a metaverse application. The users interact within the metaverse across different demographics (e.g., different ages, regions, languages, etc.).

In some embodiments, the metaverse engine 103 performs some or all of the steps for generating a synthesized first audio stream that predicts a future of the performance based on audio features of the first audio stream and mixing the synthesized first audio stream and a second audio stream associated with a second client device to form a combined audio stream that synchronizes the synthesized first audio stream and the second audio stream. The different embodiments for how the steps are divided are discussed in greater detail below.

In some embodiments, the metaverse engine 103 is implemented using hardware including a central processing unit (CPU), a field-programmable gate array (FPGA), an application-specific integrated circuit (ASIC), any other type of processor, or a combination thereof. In some embodiments, the metaverse engine 103 is implemented using a combination of hardware and software.

The database 199 may be a non-transitory computer readable memory (e.g., random access memory), a cache, a drive (e.g., a hard drive), a flash drive, a database system, or another type of component or device capable of storing data. The database 199 may also include multiple storage components (e.g., multiple drives or multiple databases) that may also span multiple computing devices (e.g., multiple server computers). The database 199 may store data associated with the metaverse engine 103, such as training data sets for the trained machine-learning model, reference audio, etc.

The client device 115 may be a computing device that includes a memory, and a hardware processor. For example, the client device 115 may include a mobile device, a tablet computer, a mobile telephone, a wearable device, a head-mounted display, a mobile email device, a portable game player, a portable music player, a reader device, or another electronic device capable of accessing a network 105.

Client device 115*a* includes metaverse application 104*a* and client device 115*n* includes metaverse application 104*b*. In some embodiments, the user 125*a* generates a communication, such as a first audio stream, using the metaverse application 104*a* on the client device 115*a* and the communication is transmitted to the metaverse engine 103 on the server 101. The server 101 transmits the communication to the metaverse application 104*b* on the client device 115*b* for the user 125*n*.

In some embodiments, the metaverse application 104 performs some or all of the steps for generating a synthesized first audio stream that predicts a future of the performance based on audio features of the first audio stream and mixing the synthesized first audio stream and a second audio stream associated with a second client device to form a combined audio stream that synchronizes the synthesized first audio stream and the second audio stream. For example, the metaverse application 104*a* on the client device 115*a* may generate a synthesized first audio stream and the metaverse application 104*b* on the client device 115*n* may mix the synthesized first audio stream and the second audio stream. In other embodiments, both synthesizing and mixing may be performed at the server 101 and the metaverse application 104*b* on the client device 115*n* outputs the mixed synthesized first audio stream and the second audio stream via a speaker.

In the illustrated embodiment, the entities of the environment 100 are communicatively coupled via a network 105. The network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 1 illustrates one network 105 coupled to the server 101 and the client devices 115, in practice one or more networks 105 may be coupled to these entities.

Computing Device Example 200

Figure 2:
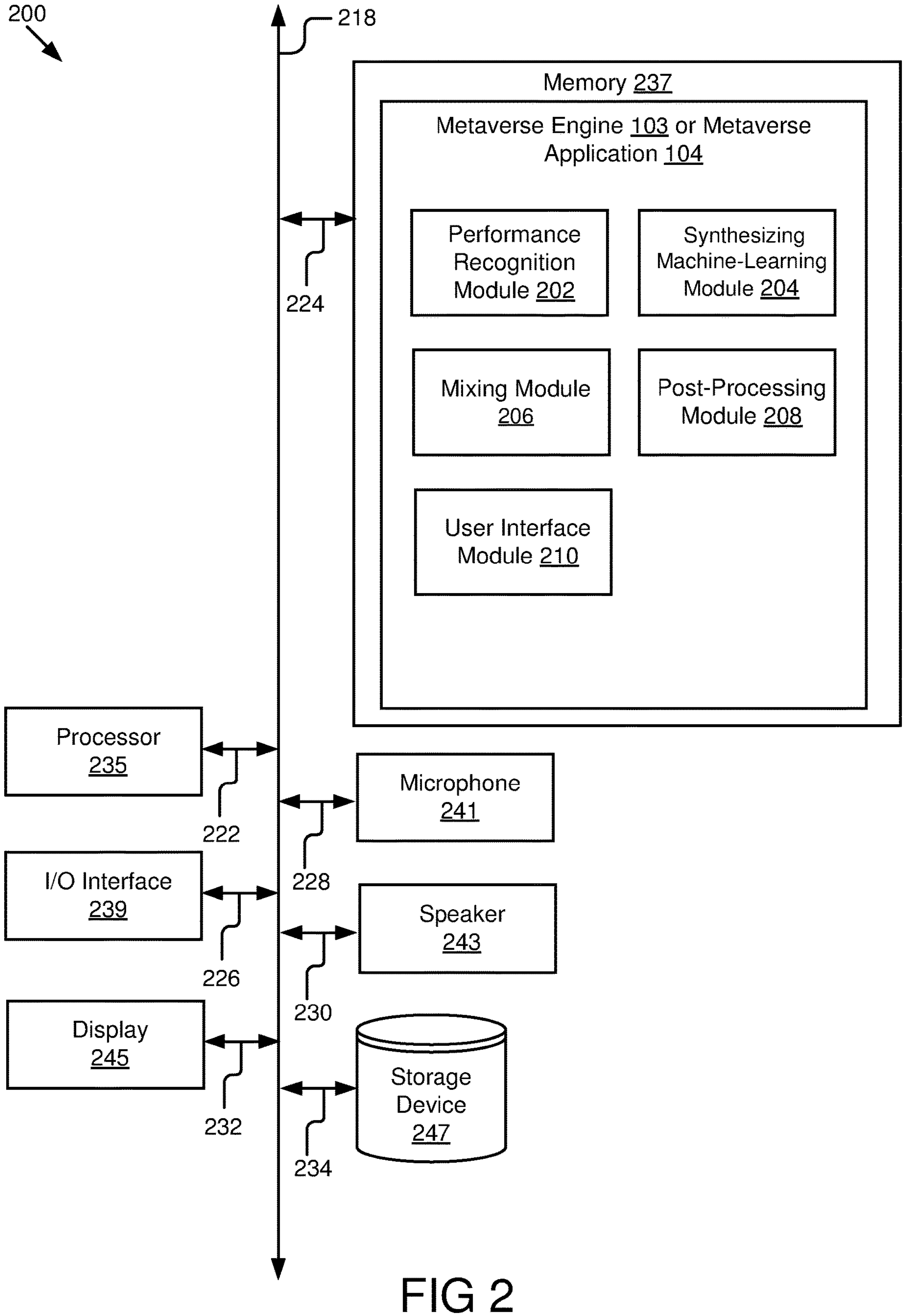
FIG. 2 is a block diagram of an example computing device to synthesize audio for synchronous communication, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is the server 101. In some embodiments, the computing device 200 is the client device 115.

In some embodiments, computing device 200 includes a processor 235, a memory 237, an Input/Output (I/O) interface 239, a microphone 241, a speaker 243, a display 245, and a storage device 247 that are each coupled via a bus 218. Depending on whether the computing device 200 is the server 101 or the client device 115, some components of the computing device 200 may not be present. For example, in instances where the computing device 200 is the server 101, the computing device may not include the microphone 241 and the speaker 243. In some embodiments, the computing device 200 includes additional components not illustrated in FIG. 2.

The processor 235 may be coupled to a bus 218 via signal line 222, the memory 237 may be coupled to the bus 218 via signal line 224, the I/O interface 239 may be coupled to the bus 218 via signal line 226, the microphone 241 may be coupled to the bus 218 via signal line 228, the speaker 243 may be coupled to the bus 218 via signal line 230, the display 245 may be coupled to the bus 218 via signal line 232, and the storage device 247 may be coupled to the bus 218 via signal line 234.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the metaverse engine 103, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 247), and input/output devices can communicate via I/O interface 239. In another example, the I/O interface 239 can receive data from the server 101 and deliver the data to the metaverse engine 103 and components of the metaverse engine 103, such as the synthesizing machine-learning module 204. In some embodiments, the I/O interface 239 can connect to interface devices such as input devices (keyboard, pointing device, touchscreen, microphone 241, sensors, etc.) and/or output devices (display devices, speaker 243, monitors, etc.).

Some examples of interfaced devices that can connect to I/O interface 239 can include a display 245 that can be used to display content, e.g., images, video, and/or a user interface of an output application as described herein, and to receive touch (or gesture) input from a user. Display 245 can include any suitable display device such as a liquid crystal display (LCD), light emitting diode (LED), or plasma display screen, cathode ray tube (CRT), television, monitor, touchscreen, three-dimensional display screen, or other visual display device.

The microphone 241 includes hardware for detecting audio performed by a user 125. For example, the microphone 241 may detect a user 125 singing, a user 125 playing the violin, etc. The microphone 241 may transmit the audio to the metaverse engine 103 via the I/O interface 239.

The speaker 243 includes hardware for generating audio for playback. For example, the speaker 243 receives instructions from the metaverse engine 103 to generate perceptive audio for playback from the digital combined audio stream generated by the metaverse engine 103. The speaker 233 converts the instructions to audio and generates the combined audio stream for the user.

The storage device 247 stores data related to the metaverse engine 103. For example, the storage device 247 may store training data sets for the trained machine-learning model, reference audio, etc. In embodiments where the computing device 200 is the server 101, the storage device 247 is the same as the database 199 in FIG. 1/.

Example Metaverse Engine 103 or Example Metaverse Application 104

FIG. 2 illustrates a computing device 200 that executes an example metaverse engine 103 or an example metaverse application 104 that includes a performance recognition module 202, a synthesizing machine-learning module 204, a mixing module 206, a post-processing module 208, and a user interface module 210. Although the modules are illustrated as being part of the same metaverse engine 103 or the same metaverse application 104, persons of ordinary skill in the art will recognize that the modules may be implemented by any computing devices 200. For example, the performance recognition module 202 and the synthesizing machine-learning module 204 may be part of a client device 115, while the mixing module 206 may be part of the server 101 to reduce the computational requirements of the client device 115.

The performance recognition module 202 determines a performance identifier associated with an audio stream. In some embodiments, the performance recognition module 202 includes a set of instructions executable by the processor 235 to determine the performance identifier associated with the audio stream. In some embodiments, the performance recognition module 202 is stored in the memory 237 of the computing device 200 and can be accessible and executable by the processor 235.

An audio stream may be a performance or rendition of a known content, e.g., a re-recording of a known song, singing a known melody, reading aloud text material, etc. A performance identifier, in this context, refers to the known content that is being performed in the audio stream. A performance identifier may enable identification and/or prediction of various attributes of the audio stream. For example, if the performance is based on written sheet music (e.g., that includes notation for tempo and sounds to be played by various instruments), identification of tempo of performance and individual sounds played by each performer. In another example, if the performance includes singing or reading aloud from a text, the upcoming words/phrases may be identified.

In some embodiments, after obtaining user permission, the performance recognition module 202 receives an audio stream. For example, where the performance recognition module 202 is part of the client device 115, the performance recognition module 202 receives the audio stream from the microphone 241 via the I/O interface 239 over the network 105. In another example, where the performance recognition module 202 is part of the server 101, the performance recognition module 202 receives the audio stream from the client device 115 via the I/O interface 239. The audio stream is part of a performance. The performance may be a song sung by multiple users, a speech, a chant, music performed with instruments, etc. In some embodiments, the user interface module 210 obtains permission to use the audio stream before the performance recognition module 202 receives the audio stream.

The performance recognition module 202 generates a fingerprint (i.e., an audio fingerprint) from at least a portion of the audio stream by generating a spectrogram of the audio stream that includes frequency as a function of time and determines which frequencies in the audio stream have the highest amplitude and then generating a hash of the spectrogram. Since the audio stream is being performed live by a person (as opposed to a pre-recorded performance), the performance recognition module 202 accounts for a difference in key, errors including an inconsistency in timing, voice character, etc. The performance recognition module 202 compares the fingerprint of the audio stream to a set of fingerprints for known songs to identify a match. The match is associated with a performance identifier for the audio stream. For example, the performance identifier may be for "Happy Birthday," "Moonlight Sonata $3^{rd}$ Movement," etc.

The performance recognition module 202 may receive a reference audio associated with the performance identifier. For example, the performance recognition module 202 may retrieve the reference audio from the storage device 247.

After obtaining user permission, the performance recognition module 202 may determine a type of performance of the audio stream. For example, the audio stream may include a person singing, a person giving a speech, a person playing a musical instrument, etc. In some embodiments, the performance recognition module 202 determines the type of performance based on unique aspects of different instruments and the human voice, such as by identifying the different frequencies, timing, pitch, velocity, etc. associated with the instruments or human voice. For example, the performance recognition module 202 may determine that "Happy Birthday" is being performed with a kazoo and "Moonlight Sonata $3^{rd}$ Movement" is being performed with a piano in the metaverse. In some embodiments, the performance recognition module 202 additionally determines a style of the performance, such as whether a singer is performing a blues version of a song, a rock version of a song, etc.

In some embodiments, the performance recognition module 202 obtains permission from a user 125 identify one or more speakers in an audio stream and associated the one or more speakers with speaker identifiers. The permission may include permission to use the audio stream for identification purposes, permission to stores information about the user, etc. The user 125 is provided guidance that this information may be stored (e.g., temporarily, until the performance ends) and are provided with options to deny permission, choose the attributes of storage (e.g., local only, for X hours, etc.). After obtaining permission, the performance recognition module 202 may for example, determine that an audio stream associated with a first client device 115 includes one person singing "Happy Birthday" or multiple people performing the song. The performance recognition module 202 may identify the different people performing the song based on a similar mechanism as described above where each performer is associated with a particular way of speaking, singing, etc. based on cadence, tone, frequency, etc.

The synthesizing machine-learning module 204 trains a machine-learning model (or multiple models) to synthesize an audio stream. In some embodiments, the synthesizing machine-learning module 204 includes a set of instructions executable by the processor 235 to train a machine-learning model to synthesize the audio stream. In some embodiments, the synthesizing machine-learning module 204 is stored in the memory 237 of the computing device 200 and can be accessible and executable by the processor 235.

The synthesizing machine-learning module 204 may use one or more (e.g., two) different training datasets. In some implementations, the datasets and corresponding structures may depend on whether the synthesizing machine-learning module 204 is stored on the client device 115 or the server 101.

Example Machine-Learning Module 204 on the Client Device 115

In embodiments where the synthesizing machine-learning module 204 is stored on the client device 115, the mapping machine-learning model 204 implements supervised learning by training the machine-learning model using a training dataset with audio streams that are manually labeled.

The synthesizing machine-learning module 204 may be a neural network, such as a deep neural network (DNN), that includes layers that identify increasingly more detailed features and patterns within the audio stream where the output of one layer serves as input to a subsequent layer. The output layer produces a synthesized audio stream. In some embodiments, a first layer (or first set of layers) outputs a mapping of an audio stream to a reference audio of the performance to determine a position of the audio stream as compared to the reference audio, a second layer (or second set of layers) outputs a prediction of a future time offset of the audio stream, and the output layer synthesizes the audio stream based on the outputs of the previous layers. In some embodiments, the machine-learning model may include a long short term memory (LSTM) nodes in a recurrent neural network (RNN) that is trained for sequential processing of audio streams. The machine-learning model can receive arbitrary audio streams as input and perform the same analysis to synthesize output.

The synthesized audio stream accounts for the network latency, input latency, and/or processing latency that cause the audio delay. Network latency occurs when there are delays in receipt of content from a transmission node to a reception node in the network due to the physical equipment used in the network or a delay in the processing time at the nodes. Input latency occurs when the user has a delayed response, is using a client device with limited capabilities, etc. Processing latency may occur when a delay is intentionally introduced in order to perform moderation analysis or due to processing resources being inadequate. Because network latency is variable, the true end-to-end latency for each audio stream may only be determined by the client device 115 at which the audio stream is played back via speakers 243.

In some embodiments, the synthesizing machine-learning module 204 advantageously accounts for the different types of input latency. For example, the performance may be Vivaldi's "Four Seasons" and the first audio stream is a violin for which a third note is delayed (as determined using the performance identifier that enables identification of the notes and the tempo for Four Seasons). The machine-learning model may adjust the first audio stream based on input latency by outputting a synthesized first audio stream that accounts for the missed third note by skipping the $16^{th}$ note. In another example, the synthesizing machine-learning module 204 may account for processing latency that is introduced for moderation by adding delay to the end of a sentence in a speech. Adding delay at the end of a sentence may be advantageous, since the perception of delay has lower impact on the listener, than delay at arbitrary points within the sentence.

Figure 3A:
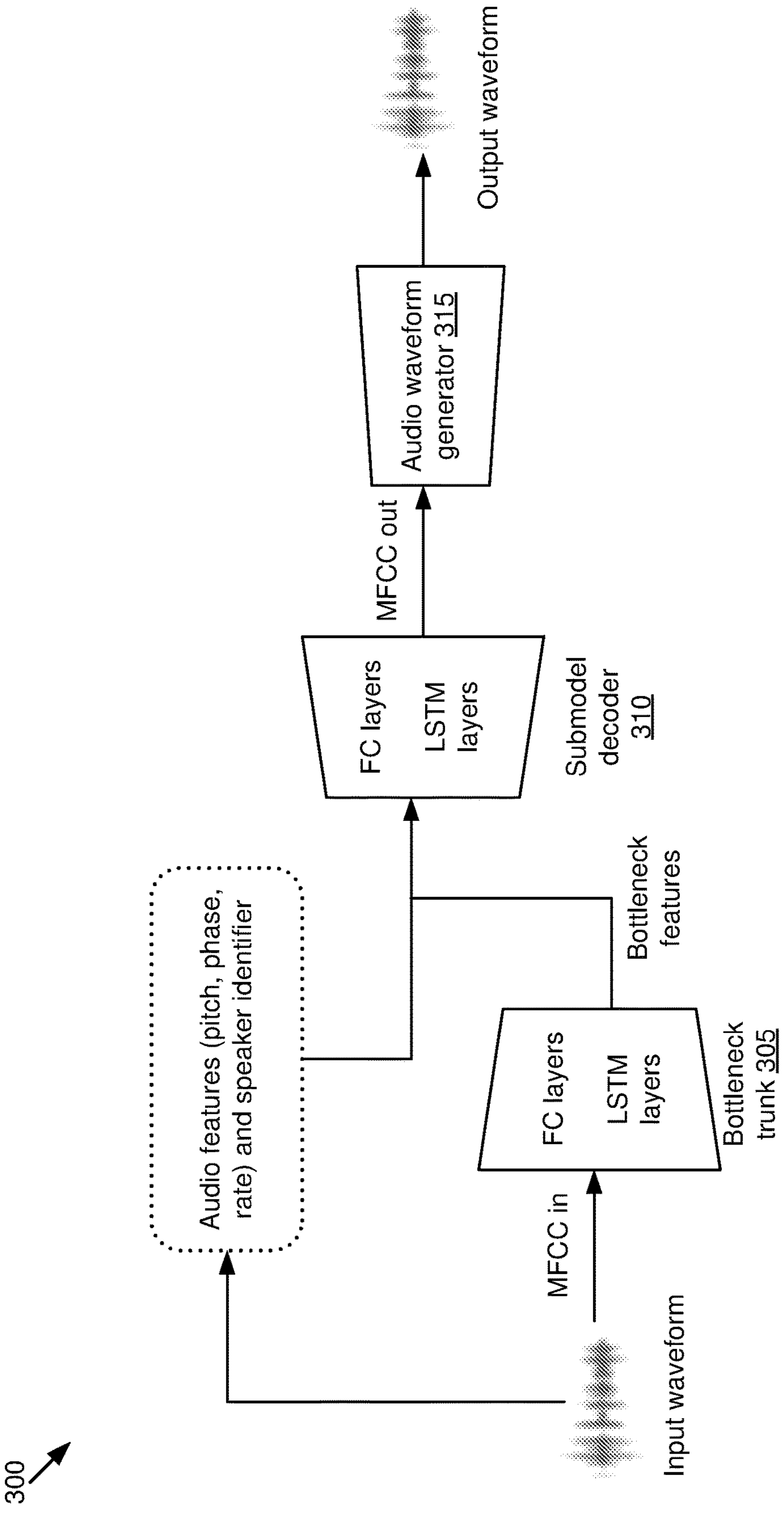
FIG. 3A is a block diagram of an example architecture of a machine-learning model, according to some embodiments described herein.

Turning to FIG. 3A, a block diagram of an example architecture of a machine-learning model 300 is illustrated. The machine-learning model 300 includes a bottleneck trunk 305, a submodel decoder 310, and an audio waveform generator 315. The bottleneck trunk 305 is a general-purpose bottleneck trunk that extracts features from an input waveform of an audio stream. The submodel decoder 310 is trained for a specific task; namely, to determine temporal correlations in the audio stream as compared to a reference audio (e.g., determined based on the performance identifier).

The bottleneck trunk 305 and the submodel decoder 310 are designed similar to machine-learning models that implement speech-to-text synthesis. The synthesizing machine-learning module 204 may train the bottleneck trunk 305 using a large number, e.g., millions of pairs, of {audio, text} samples to output bottleneck features. For example, the bottleneck trunk 305 may be trained similar to a DeepSpeech system, but instead of being trained to predict text, the bottleneck trunk 305 uses a previous layer, which holds the embedding for a mapping of audio characteristics to the reference audio.

The synthesizing machine-learning module 204 may train the submodel decoder 310 by freezing weights of the bottleneck trunk 305 after the bottleneck trunk 305 is trained and provide the bottleneck features to the submodel decoder 310 along with audio features extracted from an input waveform of an audio stream, such as pitch, phase, and rate for training. In some embodiments, the submodel decoder 310 also receives speaker identifiers, which are used to discern different voices in the audio stream.

Once the bottleneck trunk 305 and the submodel decoder 310 are trained, the bottleneck trunk 305 receives an audio stream generated by a client device 115 as input. In some embodiments, the bottleneck trunk 305 is includes fully connected (FC) layers that are followed by LSTM layers that are used to divide the audio stream into increasingly abstracted representations of audio data.

The bottleneck trunk 305 receives the audio stream as an input waveform along with mel-frequency cepstral coefficient (MFCC) features sampled from overlapping samples of the audio stream. The MFCC features are derived from a type of cepstral representation of the audio stream to represent information about the audio stream, such as a representation of the timbre in the audio stream. The samples of the audio stream are parameterized by a time window. For example, time windows of less than 100 ms long which may be less accurate than longer time windows, may be used for computational efficiency and suitability for real-time execution on a client device 115. A client device 115 which has less computational processing power than the server 101 can still generate accurate with a shorter time window because the network latency is less than the network latency that occurs when processing the audio stream at the server 101.

The bottleneck trunk 305 encodes the audio and outputs bottleneck features. The bottleneck features are transmitted to the submodel decoder 310. In some embodiments, the bottleneck trunk 305 outputs the bottleneck features for a subset of the audio frames, such as one out of every five frames in the audio stream. In some embodiments, the submodel decoder 310 also receives audio-specific features about the input waveform, such as the pitch, phase, and rate of the audio stream as well as speaker identifiers.

In some embodiments, the submodel decoder 310 includes fully connected FC layers that are followed by LSTM layers. The LSTM layers are used to capture the temporal correlations in the audio stream. The submodel decoder 310 outputs MFCC features that are input as input to an audio waveform generator 315.

The audio waveform generator 315 receives the MFCC features and generates an output waveform that represents the MFCC features rendered as synthesized audio.

Throughout this process, the machine-learning model 300 learns the temporal mapping between the position in the audio stream and synthesizes future frames of the audio stream. For example, where the performance is "Happy Birthday," the machine-learning model 300 may map the audio stream to the reference audio by determining that the audio stream includes the first two lines of the song and how that compares to the reference audio where the audio stream has a different starting point from the reference audio. This is referred to as a time offset in the audio between the audio stream and the reference audio. The machine-learning model 300 may also output a rate of the audio stream as compared to the reference audio. For example, a user singing "Happy Birthday" may sing at a faster rate than the reference audio. The machine-learning model 300 may predict the timing of the next frame in the audio stream based on the time offset, the rate of the audio stream, and a future time offset of the song based on the rate of the audio stream as compared to that of the reference audio and, as a result, output synthesized audio that encapsulates those features.

In some embodiments, instead of performing the bottleneck extraction described above, the machine-learning model 300 may implement a multilingual bottleneck extractor. The multilingual bottleneck extractor is trained to discriminate senones from multiple languages. The output features are language independent and robust to variations due to language, speaking style, speaking rate, etc. This machine-learning model 300 is trained using supervised learning, and the output includes senone posteriors.

Example Machine-Learning Model on the Client Device 115

In embodiments where the synthesizing machine-learning module 204 is stored on the server 101, the mapping machine-learning model 204 may be trained using unsupervised learning using a training dataset with audio streams that are unlabeled.

Figure 3B:
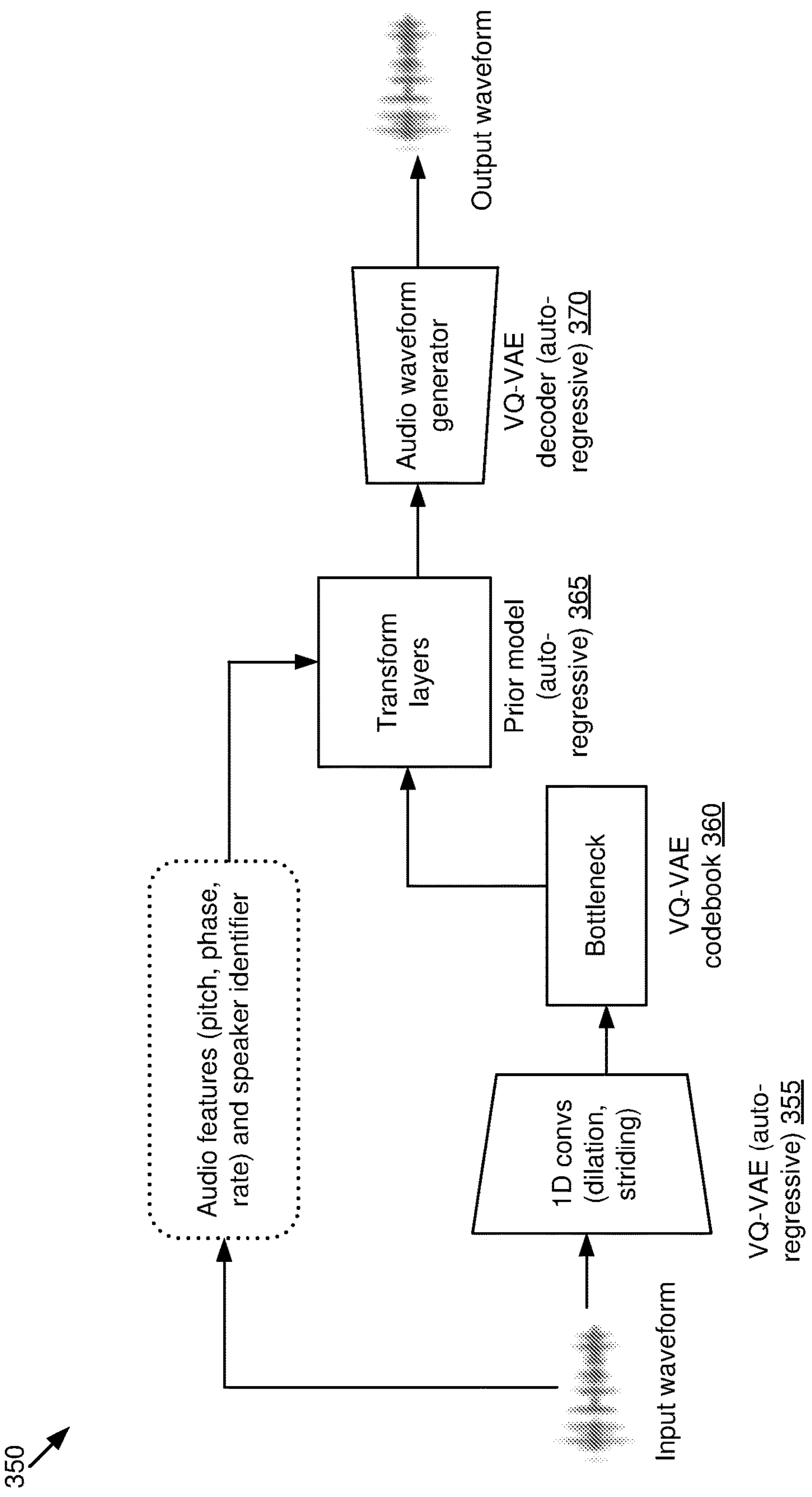
FIG. 3B is a block diagram of another example architecture of the machine-learning model, according to some embodiments described herein.

Turning to FIG. 3B is a block diagram of another example architecture of the machine-learning model 350 is illustrated. The machine-learning model 350 includes a vector quantized variational auto encoder (VQ-VAE) 355, a VQ-VAE codebook 360, a prior model 365, and a VQ-VAE decoder 370.

The synthesizing machine-learning module 204 trains the VQ-VAE 355 and the VQ-VAE codebook 360 using a training dataset that includes waveforms of audio streams. The VQ-VAE 355 and the VQ-VAE codebook 360 compare output waveforms against input waveforms to train the corresponding modules of the machine-learning model 350. The synthesizing machine-learning module 204 trains the prior model 365 on code vector outputs from the VQ-VAE codebook 360 that are conditioned on additional features, such as audio features that include one or more of pitch, phase, and rate, and, optionally, speaker identifiers.

The machine-learning model 350 is trained to receive audio streams that are parameterized by a time window. In some embodiments the audio streams are 300-500 ms long. The longer audio streams are more computationally intensive with larger model sizes, but the longer audio streams result in more accurate results.

In some embodiments, the VQ-VAE 355 receives an input waveform of an audio stream and converts the input waveform into a latent representation. The VQ-VAE 355 uses an auto-regressive network structure that includes several one-dimensional (1D) convolution blocks. The VQ-VAE codebook 360 receives the latent representation as input and the bottleneck quantizes the latent representation into a discrete code vector using a predefined codebook.

The prior model 365 receives the discrete code vector from the VQ-VAE codebook 360 along with audio features, such as pitch, phase, and rate of the input waveform as well as (optionally) one or more speaker identifiers for the audio stream. The audio features are computed from the input waveform and the one or more speaker identifiers allow the network to model the codes specific to a user or a music genre. The prior model 365 uses transform layers to extrapolate the code vectors over time and output edited and resampled code vectors. The VQ-VAE decoder 370 is an auto-regressive audio waveform generator. The VQ-VAE decoder 370 receives the edited and resampled code vectors and synthesizes the output waveform from the edited and resampled code vectors.

The mixing module 206 mixes audio streams from multiple client devices 115 to form a combined audio stream that synchronizes one or more synthesized audio streams with a real audio stream. In some embodiments, the mixing module 206 includes a set of instructions executable by the processor 235 to form a combined audio stream. In some embodiments, the mixing module 206 is stored in the memory 237 of the computing device 200 and can be accessible and executable by the processor 235.

In some embodiments, the mixing module 206 receives the output of the synthesizing machine-learning module 204 and synchronizes the audio streams based on the output. For example, the mixing module 206 may receive a synthesized first audio stream and a second audio stream and produces a combined audio stream. Dependent on whether the mixing is being performed at the server 101 or a client device 115, the mixing module 206 may introduces different amounts of delay in the different audio streams to account for the different types of delay and ensure that the audio streams are synchronized. For example, if the mixing is performed on the server 101, the mixing module 206 may account for receiver delay. Details of the different factors for mixing audio streams are discussed in greater detail below.

The mixing module 206 synchronizes the synthesized first audio stream and the second audio stream to form a combined audio stream. The time window of the audio streams may have varying lengths based on the device that stores the synthesizing machine-learning module 204. For example, where the synthesizing machine-learning module 204 is stored on the client device 115, the time window is less than 100 ms. In another example, where the synthesizing machine-learning module 204 is stored on the server 101, the time window is 300-500 ms.

The mixing module 206 may perform the synchronization on the same device or a different device than where the synthesizing machine-learning module 204 is stored. The devices may include a server 101, a client device 115*a* that sends the first audio stream, and a client device 115*b* that receives the first audio stream.

In a first example, a client device 115*b* performs both the synthesizing of the audio streams and the synchronizing of the audio streams. The synthesizing machine-learning module 204 receives globally time-stamped packets from all other client devices 115 via the server 101 and synthesizes the audio streams of the other client devices 115. The mixing module 206 generates a local mix from the real audio stream of the client device 115*b* and synthesized audio from the other client devices 115.

In some embodiments, the first example is the preferred example. There are several advantages of the first example. The time needed to predict into the future part of audio streams is reduced, which results in a higher quality of audio streams and a lower interaction latency. In addition, the client device 115*b* is able to recover from poor latency. Although a user may have to use a client device with substantial computational capability in order to synthesize and synchronize audio locally, the better hardware can provide a better experience. Lastly, this architecture provides a benefit that the synthesized audio stays on the client device 115*b*.

Some possible disadvantages of the first example are that the computational complexity is O(n) for an incoming stream for n performers. Furthermore, because all the processing is on the client device 115*b* and the processing is significant, the processing may drain the battery of the client device 115*b*, the processing may be difficult, requiring different implementation code for different types of client devices 115, and may only work on a subset of client devices 115 that have sufficient computational capacity.

In a second example, the server 101 performs both the synthesizing of the audio streams and the synchronizing of the audio streams. The advantages of the second example include a lower computational complexity of O1) since all client streams are received and processed at the server. In this example, no client side computation is required to generate the combined audio stream, since the server 101 receives individual audio stream from each client and provides the synthesized and synchronized combined audio stream to each client. The infrastructure is controlled because it is all part of the server 101. Further, the prediction time for the worst case is lower than when client side processing is used, since only the latency between the worst case latency of an audio stream is that between client and server, whereas in client side processing, it may be between a client device 115*a* to a server 101 and then to a client device 115*b*.

In a third example, a client device 115*a* performs the synthesizing of the audio streams and the server 101 performs the synchronizing of the audio streams. The client device 115*a* synthesizes the audio streams for worst-case latency, the server 101 mixes (n−1) streams to the same time in lockstep for player by delaying each audio stream as needed. Advantages of the third example include that the incoming streams and the outgoing streams are O(1) per client device 115 and the processing time at the server is O(1). In addition, better hardware on the client device 115*a* makes the client device 115*a* sound better to the other client devices 115. For example, better hardware results in better processing, which is essential when having to process audio streams quickly to maintain near real-time transmission of the audio streams.

In a fourth example, a client device 115*a* performs the synthesizing of the audio streams and a client device 115*b* performs the synchronizing of the audio streams. This may be suitable for peer-to-peer streaming where no server is involved.

In instances where no post-processing occurs and the mixing module 206 does not perform synthesis on the client device 115*b*, the mixing module 206 instructs the I/O interface 239 to transmit the combined audio stream to the client device 115*b*, which may play the combined audio stream. In instances where no post-processing occurs and the mixing module 206 is on the client device 115*b*, the mixing module 206 may instruct the I/O interface 239 to provide the combined audio stream to the speakers 243 for playback.

The post-processing module 208 processes a combined audio stream. In some embodiments, the post-processing module 208 includes a set of instructions executable by the processor 235 to process the combined audio stream. In some embodiments, the post-processing module 208 is stored in the memory 237 of the computing device 200 and can be accessible and executable by the processor 235.

In some embodiments, the post-processing module 208 may modify the combined audio stream to be consistent with acoustics of an environment where the client device 115*b* is located by accounting for echo, background noise, etc. In some embodiments, the post-processing module 208 performs audio cleaning or noise suppression for the combined audio stream to avoid a situation where, for example, a first audio stream includes cars honking in the background and a second audio stream where the room is absolutely silent, which could result in dissonance as a combined audio stream went from having background noise to having no background noise.

The user interface module 210 generates a user interface. In some embodiments, the user interface module 210 includes a set of instructions executable by the processor 235 to generate the user interface. In some embodiments, the user interface module 210 is stored in the memory 237 of the computing device 200 and can be accessible and executable by the processor 235.

The user interface module 210 generates a user interface for users 125 associated with client devices 115. The user interface may be used to initiate audio communication with other users, participate in games or other experiences in the metaverse, send text to the other users, initiate video communication with other users, etc.

In some embodiments, before a user participates in the metaverse, the user interface module 214 generates a user interface that includes information about how the user's information is collected, stored, and analyzed. For example, the user interface requires the user to provide permission to use any information associated with the user. The user is informed that the user information may be deleted by the user, and the user may have the option to choose what types of information are provided for different uses. The use of the information is in accordance with applicable regulations and the data is stored securely. Data collection is not performed in certain locations and for certain user categories (e.g., based on age or other demographics), the data collection is temporary (i.e., the data is discarded after a period of time), and the data is not shared with third parties. Some of the data may be anonymized, aggregated across users, or otherwise modified so that specific user identity cannot be determined.

In some embodiments, the user interface obtains user permission before any audio streams are transmitted to the server 101 or another client device 115. The user interface may include different levels of granularity of user permissions. For example, a user may specify that the synthesized audio can only be generated when it is generated on the client device 115 and not on the server.

In some embodiments, the mixing module 206 determines that a time difference between the first audio stream and the second audio stream exceeds a threshold time difference and sends an instruction to the user interface module 210 to generate a user interface. The user interface may provide guidance to the user 125 for how to change their rate of singing so that the audio stream can be synchronized with another audio stream.

Figure 4:
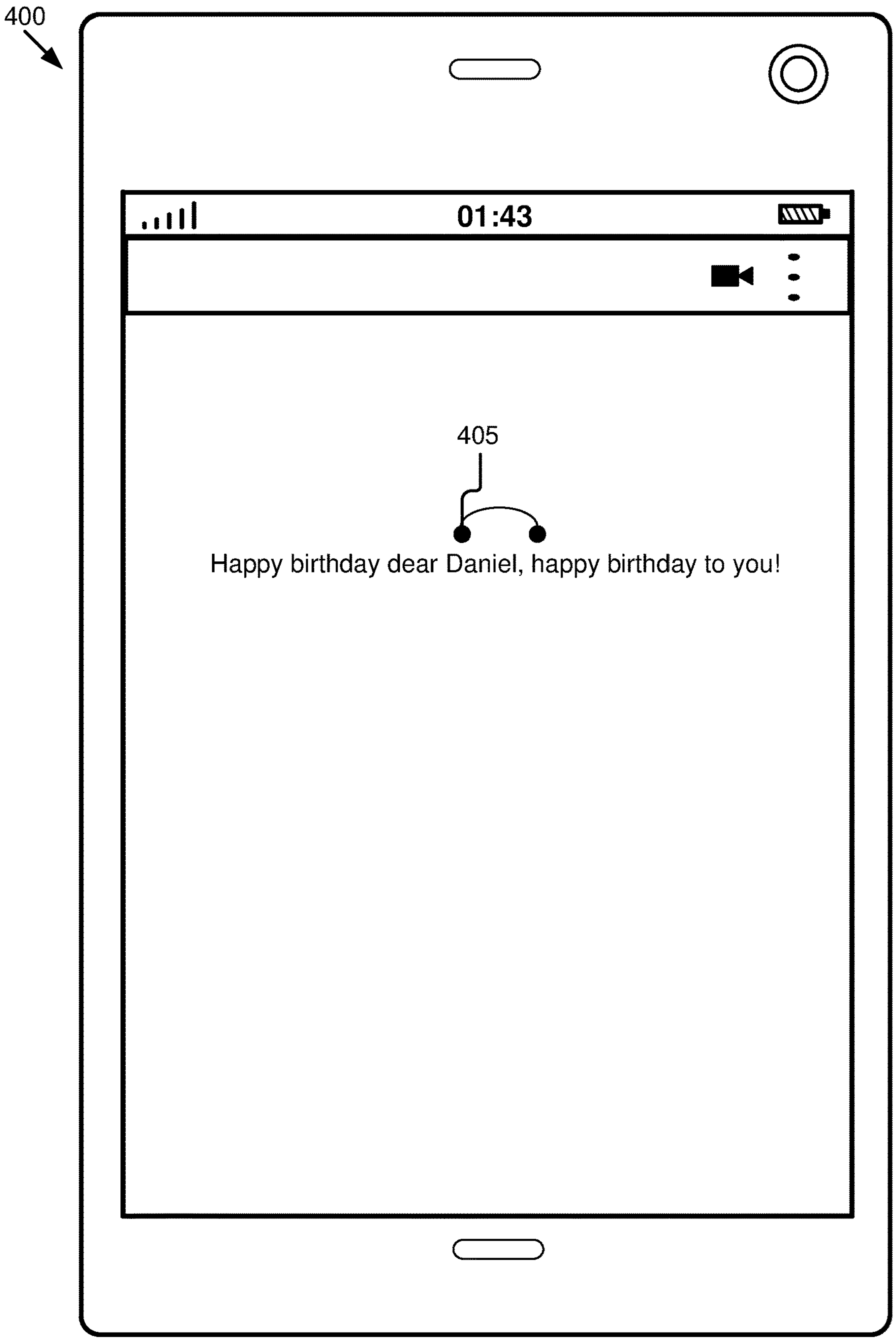
FIG. 4 is an example user interface that guides a user to change a timing aspect of a performance, according to some embodiments described herein.

Turning to FIG. 4, an example user interface 400 is illustrated that guides a user to change a timing aspect of a performance. In this example, the user interface 400 includes user guidance for the performance and a moving indicator 405 that prompts a performer associated with the client device 115*b* to perform in a way that reduces the time difference between a first audio stream and a second audio stream. For example, the moving indicator 405 may move slower than the user is performing to suggest a slowdown in the rate of the user's performance.

In some embodiments, the user interface module 210 illustrates the synchronization of the combined audio stream with actions of performers that are displayed graphically. For example, if the combined audio stream is a speech that players are performing while they are displayed graphically as avatars, the user interface module 210 may synchronize the combined audio stream with the avatars' mouths, movements, etc.

Example Methods

Figure 5:
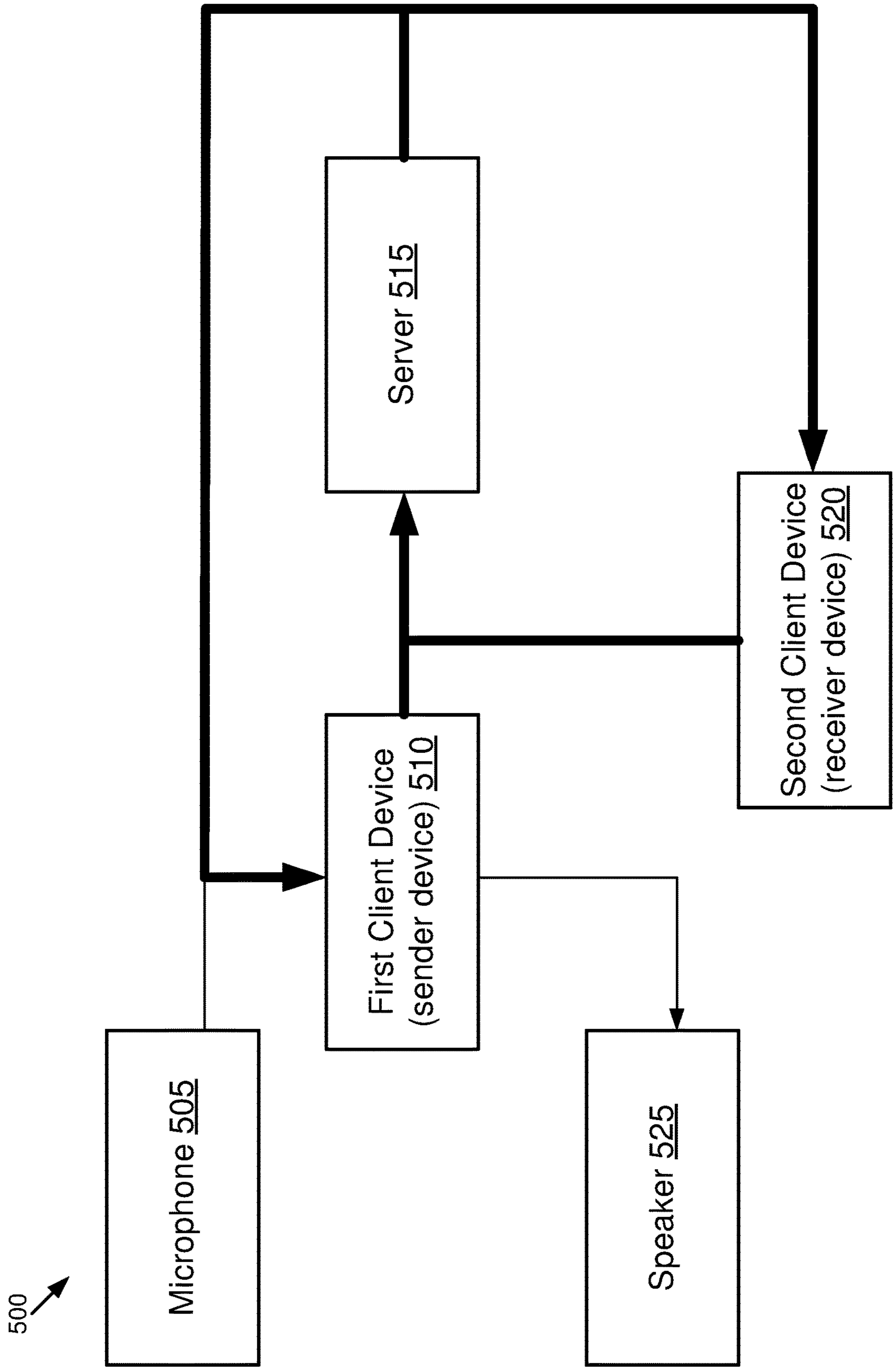
FIG. 5 is an example flow diagram that illustrates the transmission of data between client devices and a server, according to some embodiments described herein.

FIG. 5 is an example flow diagram 500 that illustrates the transmission of data between the client devices 115 and the server 101, according to some embodiments described herein. The flow diagram 500 includes a first client device 510, a server 515, and a second client device 520. The thicker lines indicate network data transmission between these three devices and the thinner lines indicate data transmission within the first client device 510.

The first client device 510 receives an audio stream from the microphone 505. The audio stream is synthesized at the first client device 510, the server 515, or the second client device 520. The synthesized audio stream is mixed with one or more other audio streams at the server 515 or the second client device 520 to form a combined audio stream. The combined audio stream is transmitted to the speaker 525 for playback at the first client device 510.

In addition to the above, data is also received by the server 515. For example, the server 515 may receive a first stream from the first client device 510 and a second stream from the second client device 520, where the server 515 synthesizes the first audio stream and mixes it with the second audio stream.

As a result of implementing the metaverse engine 103, a first audio stream of violin at the first client device 510 and a second audio stream of cello are heard by associated users performing the music at the same time as if they were in the same physical room.

Figure 6:
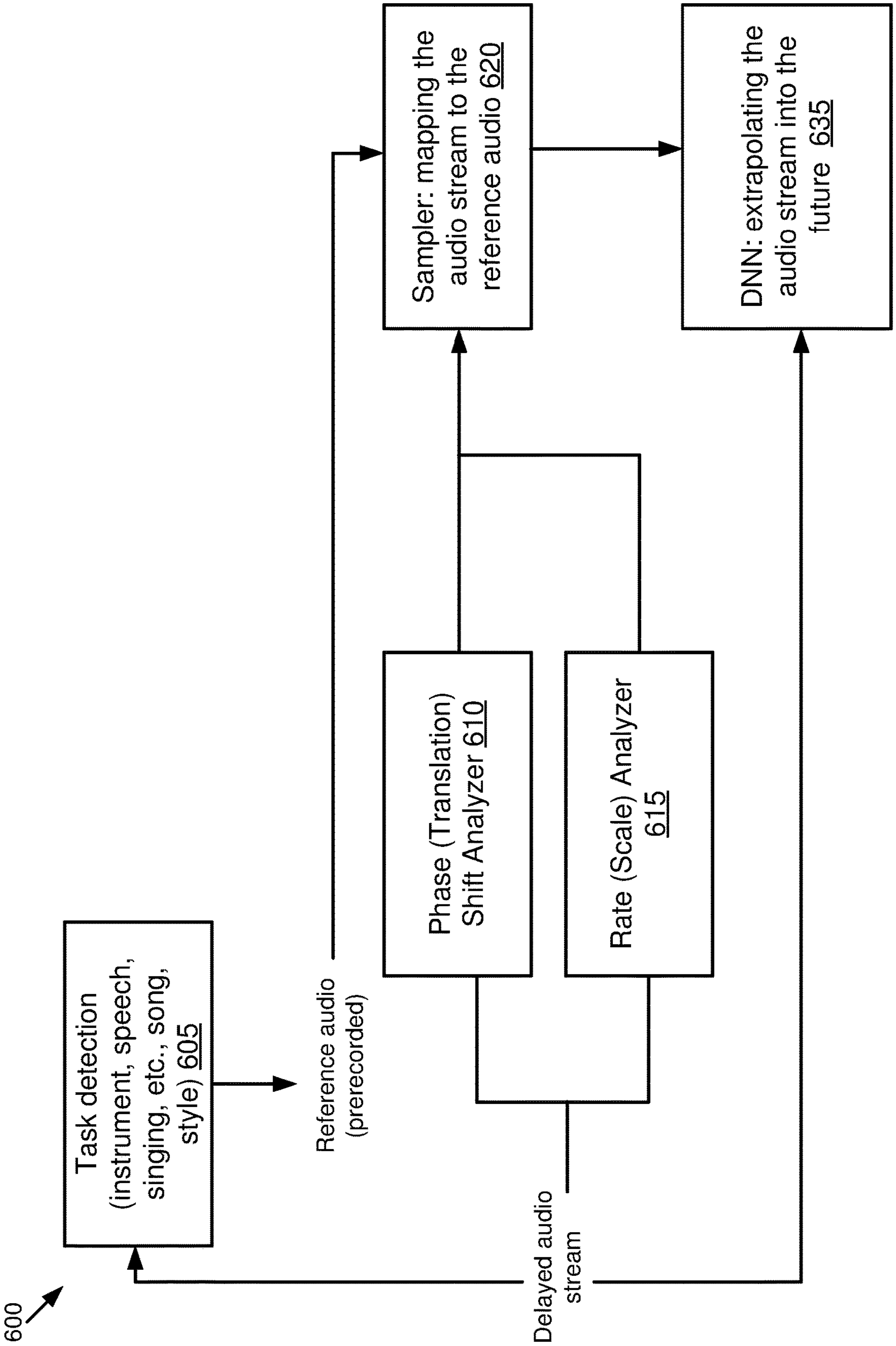
FIG. 6 is an example flow diagram to synthesize an audio stream, according to some embodiments described herein.

FIG. 6 is an example flow diagram 600 to synthesize an audio stream for synchronous communication. Task detection 605 is performed on a delayed audio stream to identify a performance identifier and a type of performance. For example, an identification is made of whether the delayed audio stream includes instruments, a speech, singing, etc. and also what type of song and a style of the performance. A reference audio is output based upon the identification.

The delayed audio stream is also received by a phase shift analyzer 610 that identifies a time offset of the delayed audio stream as compared to a reference audio and a rate analyzer 615 that identifies a rate of the delayed audio stream. The time offset and the rate of the delayed audio stream are received by a sampler 620, which maps the audio stream to the reference audio. The mapping is received by a deep neural network 635 (or other suitable model) that extrapolates the audio stream into the future to complete the synthesis of the audio stream.

Figure 7:
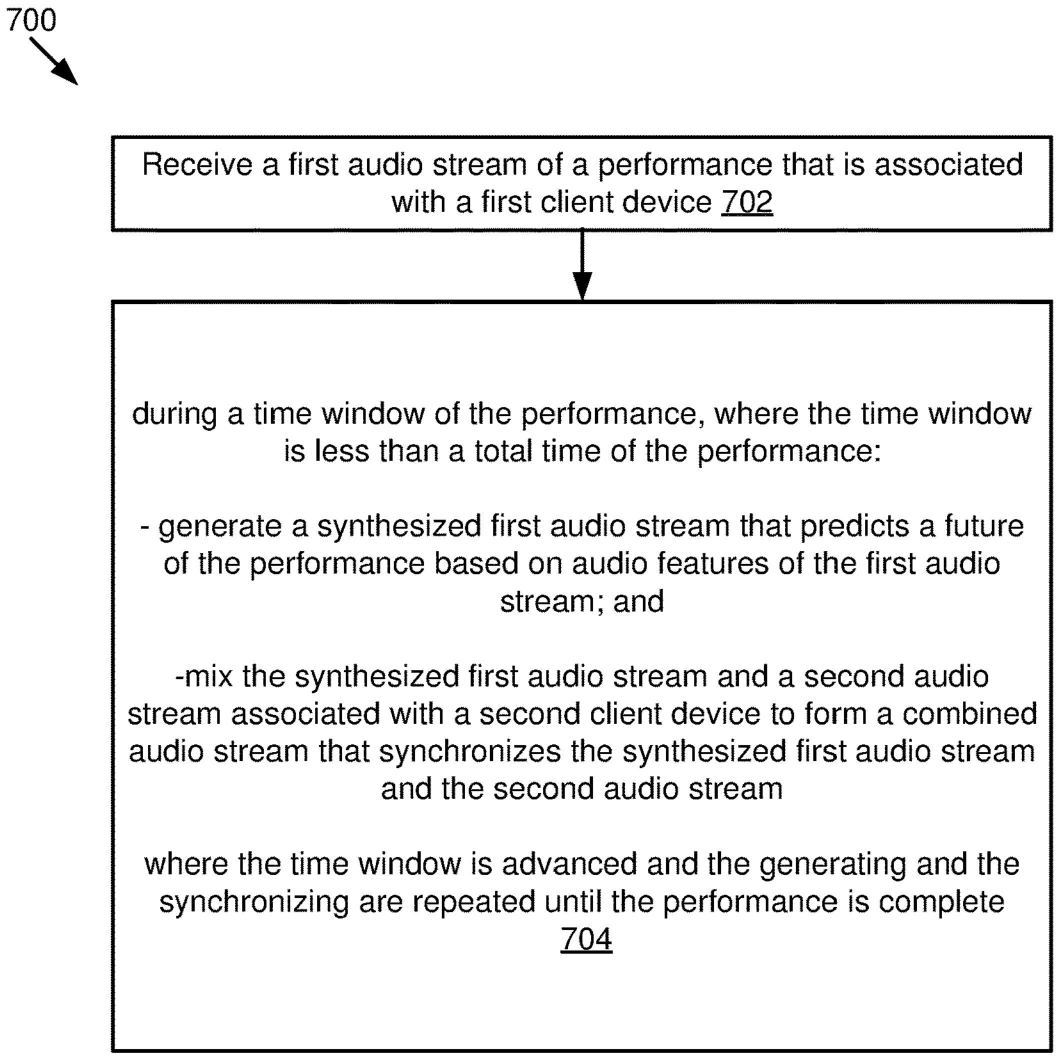
FIG. 7 is an example flow diagram to synthesize an audio stream for synchronous communication, according to some embodiments described herein.

FIG. 7 is an example flow diagram to synthesize an audio stream for synchronous communication using a second client device 115. In this example, the metaverse application 104 is stored on the second client device 115.

The method 700 may begin at block 702. At block 702, a first audio stream of a performance is received that is associated with a first client device 115. Block 702 may be followed by block 704.

At block 704, during a time window of the performance, where the time window is less than a total time of the performance: generate a synthesized first audio stream and a second audio stream associated with a second client device to form a combined audio stream that synchronizes the synthesized first audio stream and the second audio stream and mix the synthesized first audio stream and a second audio stream associated with a second client device to form a combined audio stream that synchronizes the synthesized first audio stream and the second audio stream, where the time window is advanced and the generating and the synchronizing are repeated until the performance is complete.

FIG. 7 is an example flow diagram to synthesize an audio stream for synchronous communication using a second client device 115. In this example, the metaverse application 104 is stored on the second client device 115.

Figure 8:
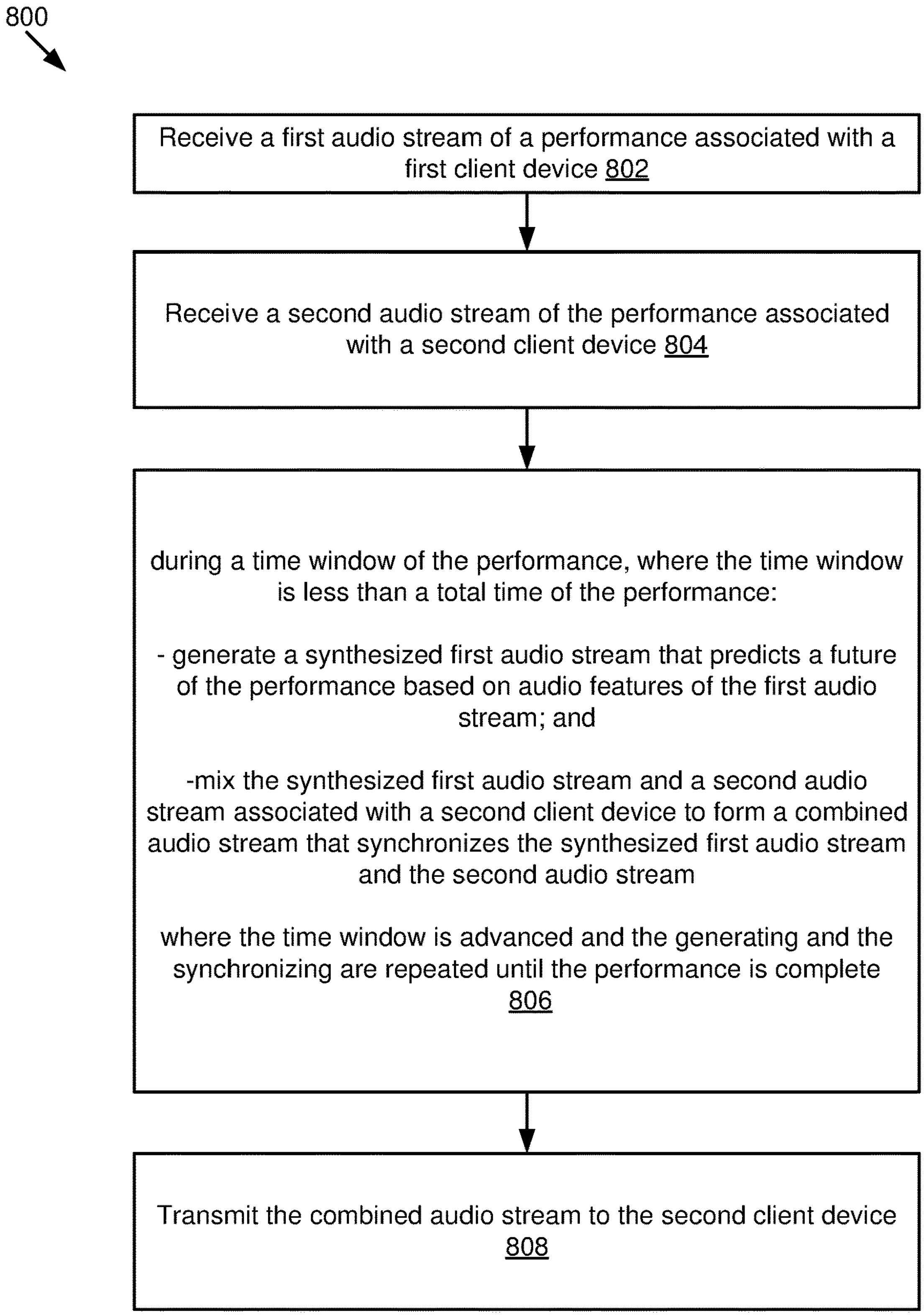
FIG. 8 is an example flow diagram to synthesize audio for synchronous communication using a server, according to some embodiments described herein.

FIG. 8 is another example flow diagram to synthesize audio for synchronous communication using a server. In this example, the metaverse engine 103 is stored on the server 101.

The method 800 may begin at block 802. At block 802, a first audio stream of a performance associated with a first client device 115 is received. Block 802 may be followed by block 804.

At block 804, during a time window of the performance, where the time window is less than a total time of the performance: generate a synthesized first audio stream and a second audio stream associated with a second client device to form a combined audio stream that synchronizes the synthesized first audio stream and the second audio stream and mix the synthesized first audio stream and a second audio stream associated with a second client device to form a combined audio stream that synchronizes the synthesized first audio stream and the second audio stream, where the time window is advanced and the generating and the synchronizing are repeated until the performance is complete. In some embodiments, mixing the synthesized first audio stream includes introducing delay into the combined audio stream to account for latency that occurs through transmitting the combined audio to the second client device. Block 804 may be followed by block 806.

At block 806, the combined audio stream is transmitted to the second client device 115.

Various embodiments described herein include obtaining data from various sensors in a physical environment, analyzing such data, generating recommendations, and providing user interfaces. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., client device only; client+server device; etc.) and where the data analysis is performed (e.g., client device only; client+server device;

etc.). Data are utilized for the specific purposes as described herein. No data is shared with third parties without express user permission.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:

receiving a first audio stream of a performance associated with a first client device; and during a time window of the performance, wherein the time window is less than a total time of the performance:

generating a synthesized first audio stream that predicts a future of the performance based on audio features of the first audio stream; and mixing the synthesized first audio stream and a second audio stream associated with a second client device to form a combined audio stream that synchronizes the synthesized first audio stream and the second audio stream;

wherein the time window is advanced and the generating and the mixing are repeated until the performance is complete.

2. The method of claim 1, further comprising:

responsive to receiving the first audio stream, determining a performance identifier for the performance associated with the first audio stream; and receiving a reference audio based on the performance identifier.

3. The method of claim 2, wherein:

generating the synthesized first audio stream includes determining a time offset between the first audio stream and the reference audio; and the time offset occurs when the first audio stream has a different starting point from the reference audio and generating the synthesized first audio stream is further based on the time offset.

4. The method of claim 2, wherein:

generating the synthesized first audio stream includes determining a rate of the first audio stream as compared to a rate of the reference audio; and generating the synthesized first audio stream is further based on the rate of the first audio stream as compared to the rate of the reference audio.

5. The method of claim 1, wherein the audio features of the first audio stream are selected from the group of pitch, rate, phase, or combinations thereof.

6. The method of claim 1, wherein the audio features of the first audio stream include one or more speaker identifiers detected in the first audio stream.

7. The method of claim 1, further comprising:

determining that a time difference between the first audio stream and the second audio stream exceeds a threshold time difference; and generating graphical data for displaying a user interface that includes user guidance for the performance and a moving indicator that prompts a performer associated with the second client device to perform in a way that reduces the time difference between the first audio stream and the second audio stream.

8. The method of claim 1, further comprising modifying the combined audio stream to be consistent with acoustics of an environment where the second client device is located.

9. The method of claim 1, wherein generating the synthesized first audio stream includes:

identifying that a portion of the performance was skipped in the first audio stream; and synthesizing the first audio stream to correct for the portion of the performance that was skipped.

10. The method of claim 1, further comprising synchronizing the combined audio stream to match actions of performers that are displayed graphically.

11. A device comprising:

a processor; and a memory coupled to the processor, with instructions stored thereon that, when executed by the processor, cause the processor to perform operations comprising:

receiving a first audio stream of a performance associated with a first client device; and during a time window of the performance, wherein the time window is less than a total time of the performance:

generating a synthesized first audio stream that predicts a future of the performance based on audio features of the first audio stream; and mixing the synthesized first audio stream and a second audio stream associated with a second client device to form a combined audio stream that synchronizes the synthesized first audio stream and the second audio stream;

wherein the time window is advanced and the generating and the mixing are repeated until the performance is complete.

12. The device of claim 11, wherein:

responsive to receiving the first audio stream, determining a performance identifier for the performance associated with the first audio stream; and receiving a reference audio based on the performance identifier.

13. The device of claim 12, wherein generating the synthesized first audio stream includes:

generating the synthesized first audio stream includes determining a time offset between the first audio stream and the reference audio; and the time offset occurs when the first audio stream has a different starting point from the reference audio and generating the synthesized first audio stream is further based on the time offset.

14. The device of claim 12, wherein:

generating the synthesized first audio stream includes determining a rate of the first audio stream as compared to a rate of the reference audio; and generating the synthesized first audio stream is further based on the rate of the first audio stream as compared to the rate of the reference audio.

15. The device of claim 11, wherein the audio features of the first audio stream are selected from the group of pitch, rate, phase, or combinations thereof.

16. A non-transitory computer-readable medium with instructions stored thereon that, when executed by one or more computers, cause the one or more computers to perform operations, the operations comprising:

receiving a first audio stream of a performance associated with a first client device; and during a time window of the performance, wherein the time window is less than a total time of the performance:

generating a synthesized first audio stream that predicts a future of the performance based on audio features of the first audio stream; and mixing the synthesized first audio stream and a second audio stream associated with a second client device to form a combined audio stream that synchronizes the synthesized first audio stream and the second audio stream;

wherein the time window is advanced and the generating and the mixing are repeated until the performance is complete.

17. The computer-readable medium of claim 16, wherein:

responsive to receiving the first audio stream, determining a performance identifier for the performance associated with the first audio stream; and receiving a reference audio based on the performance identifier.

18. The computer-readable medium of claim 17, wherein:

generating the synthesized first audio stream includes determining a time offset between the first audio stream and the reference audio; and the time offset occurs when the first audio stream has a different starting point from the reference audio and generating the synthesized first audio stream is further based on the time offset.

19. The computer-readable medium of claim 17, wherein:

generating the synthesized first audio stream includes determining a rate of the first audio stream as compared to a rate of the reference audio; and generating the synthesized first audio stream is further based on the rate of the first audio stream as compared to the rate of the reference audio.

20. The computer-readable medium of claim 16, wherein the audio features of the first audio stream are selected from the group of pitch, rate, phase, or combinations thereof.

* * * * *